US008649659B2

(12) United States Patent
Lalwaney

(10) Patent No.: US 8,649,659 B2
(45) Date of Patent: Feb. 11, 2014

(54) METHOD AND SYSTEM FOR TRANSITIONING MEDIA OUTPUT AMONG TWO OR MORE DEVICES

(75) Inventor: Poornima Lalwaney, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 402 days.

(21) Appl. No.: 12/899,411

(22) Filed: Oct. 6, 2010

(65) Prior Publication Data
US 2012/0087634 A1   Apr. 12, 2012

(51) Int. Cl.
*H04N 5/80*   (2006.01)

(52) U.S. Cl.
USPC ............. 386/241; 386/E5.003; 709/232

(58) Field of Classification Search
USPC ............... 386/241, E05.003; 709/232
See application file for complete search history.

(56) References Cited

U.S. PATENT DOCUMENTS

| 7,103,906 | B1 * | 9/2006 | Katz et al. ............. 725/87 |
| 2005/0063335 | A1 * | 3/2005 | Shenfield et al. ....... 370/329 |
| 2008/0155062 | A1 | 6/2008 | Rabold et al. |
| 2009/0204663 | A1 * | 8/2009 | Patwari ................. 709/203 |
| 2009/0259711 | A1 * | 10/2009 | Drieu et al. ............ 709/201 |
| 2011/0197224 | A1 * | 8/2011 | Meijer ................... 725/34 |

FOREIGN PATENT DOCUMENTS

EP   2088737 A2   8/2009

OTHER PUBLICATIONS

Notification of Transmittal of International Search Report and Written Opinion of the International Searching Authority; International Application No. PCT/US2011/054837; Dec. 7, 2011; 10 pages.
U-verse Total Home DVR—Digital Video Recorder; www.att.com/Common/totalhomedvr; 2009; 1 page.

* cited by examiner

*Primary Examiner* — Thai Tran
*Assistant Examiner* — Girumsew Wendmagegn

(57) ABSTRACT

In at least some embodiments, the present invention relates to methods and systems for enabling media content to be utilized or output by way of media presentation devices. In one such embodiment, a method includes receiving at a first cloud a first signal from a first media presentation device indicative of a request or command that a content signal transmission be paused, and sending a second signal including bookmark information from the first cloud to a second media presentation device. The method further includes receiving a third signal from the second media presentation device, the third signal being indicative of a further request or command that the transmission of the media content signal be resumed, and resuming the transmission. In additional embodiments, the present invention relates to methods of operating a media presentation device so as to perform a resumed displaying of video media content.

27 Claims, 4 Drawing Sheets

METHOD AND SYSTEM FOR TRANSITIONING MEDIA OUTPUT AMONG TWO OR MORE DEVICES

FIELD OF THE INVENTION

The present invention relates to mobile devices and other devices that display, output, or otherwise facilitate a user's consumption of, media content.

BACKGROUND OF THE INVENTION

An important function of mobile devices as well as other devices (such as personal computers, video game consoles, televisions, etc.) is to display, output and/or otherwise facilitate a user's consumption of a variety of media. As such, these mobile and other devices can collectively be thought of as "media presentation devices". A variety of technologies have been developed that allow for or facilitate the transmission and consumption of such media, including for example video streaming content delivery technologies.

It is not uncommon for a person who is interested in watching or otherwise consuming media content by way of a media presentation device to move among different locations or otherwise undergo changes in circumstance where it is not possible to continue watching (or otherwise experiencing/interacting with) that media content by way of that same media presentation device. Commonly, when this occurs, the person will experience an undesirable interruption in his or her observation or other consumption of the media.

For example, a person may move from a first room in the person's home, at which a personal computer is available for the person to watch certain media, to a second room in the person's home, where a television set (but not the computer) is present. Also for example, even if a person remains within the same room of a house, the person may face a situation where an original media presentation device such as a television set is no longer available for presentation of the media content of interest, even though another media presentation device in that room could still theoretically be utilized to present the media content (for example, because another person has entered the room who needs to watch other media content on the original media presentation device).

There already do exist some systems that make it possible for particular media content of interest to be displayed (or otherwise output or utilized) at multiple locations and even potentially switched from one location to another. For example, a television program delivered via cable into a home can potentially be displayed by multiple televisions in multiple rooms and even switched from being displayed in one room to being displayed in another room, particularly if multiple cable television signal processing boxes are present in the different rooms and are coordinated appropriately.

However, such existing systems tend to be limited in their capabilities and often operate in accordance only with special in-home protocols or proprietary standards determined by the media content providers (e.g., the cable television provider). More particularly, many such existing systems are not adequate for allowing arbitrary media content to be provided to and shifted among a variety of different types of media presentation devices, much less shifted among different media presentation devices in a manner that minimizes interruption. In some circumstances, deep integration between the media presentation devices and program guide applications are required, which particularly restricts the ability to shift media among various types of media presentation devices.

More particularly in this regard, there currently exists a three-screen pause and pick up video system that is defined in standards as an IP multi-media subsystem (IMS). IMS, although standards based, requires deployment of customized and expensive infrastructure to support such services.

It would therefore be advantageous if an improved system and method for operating media presentation devices that would alleviate one or more of the above-discussed problems could be developed.

SUMMARY OF THE INVENTION

In at least one embodiment, the present invention relates to a method of enabling media content to be utilized by way of a plurality of media presentation devices including a first media presentation device and a second media presentation device. The method includes receiving at a first cloud a first signal from the first media presentation device indicative of a request or command that a transmission of a media content signal by at least one cloud be paused, the at least one cloud including the first cloud, and sending a second signal from the first cloud to the second media presentation device, the second signal including bookmark information indicative of a location within the media content at which the media content signal has been paused. The method further includes receiving a third signal from the second media presentation device, the third signal being indicative of a further request or command that the transmission of the media content signal from the at least one cloud be resumed, and resuming the transmission of the media content signal from the at least one cloud, where the resumed transmission is received by the second media presentation device, and wherein the media content signal provides a portion of the media content beginning at or substantially at the location indicated by the bookmark information.

Further, in at least one embodiment, the present invention relates to a method of operating a media presentation device so as to perform a resumed displaying of video media content subsequent to a pausing of a previous displaying of the video media content. The method includes sending a first signal to a first cloud by which the media presentation device is registered with the first cloud, and receiving a second signal from the first cloud at the media presentation device, the second signal including bookmark information indicative of a location within the video media content at which the pausing occurred. The method additionally includes sending a third signal from the media presentation device, the third signal being indicative of a request or command to begin the resumed displaying or being configured to precipitate a transmission of at least a first portion of the video media content so as to allow for the resumed displaying, receiving at the media presentation device the first portion of the video media content, and performing the resumed displaying of the video media content based at least in part upon the received first portion of the video media content, the resumed displaying beginning at or substantially at the location.

Additionally, in at least one embodiment, the present invention relates to a system for enabling media content to be output by way of a plurality of media presentation devices. The system includes a first cloud having a first processing device and a first memory device, the first cloud storing registration information received from the plurality of media presentation devices. The system also includes a second cloud in communication with the first cloud, the second cloud having a second memory device and a second processing device including an adaptive transcoder. The first cloud serves as a first intermediary between the second cloud and the plurality of media presentation devices, and the second cloud serves as a second intermediary between the first cloud and a plurality of media content sources. Additionally, the first cloud is configured to operate so that, upon receiving a pause signal from a first of the media presentation devices including bookmark information indicating a location within the media content at which an outputting of the media content has been paused, the first cloud sends the bookmark information for receipt by one or more others of the media presentation devices as well as to the second cloud. Also, the first cloud further is configured to operate so that, upon receiving a resume signal from a second of the media presentation devices, the first cloud communicates a resume instruction based upon the resume signal to the second cloud and correspondingly the second cloud causes a media content signal to be sent for receipt by the second media presentation device, whereby the second media presentation device is able to output at least a portion of the media content beginning at our substantially at the location.

DETAILED DESCRIPTION OF THE INVENTION

Figure 1:
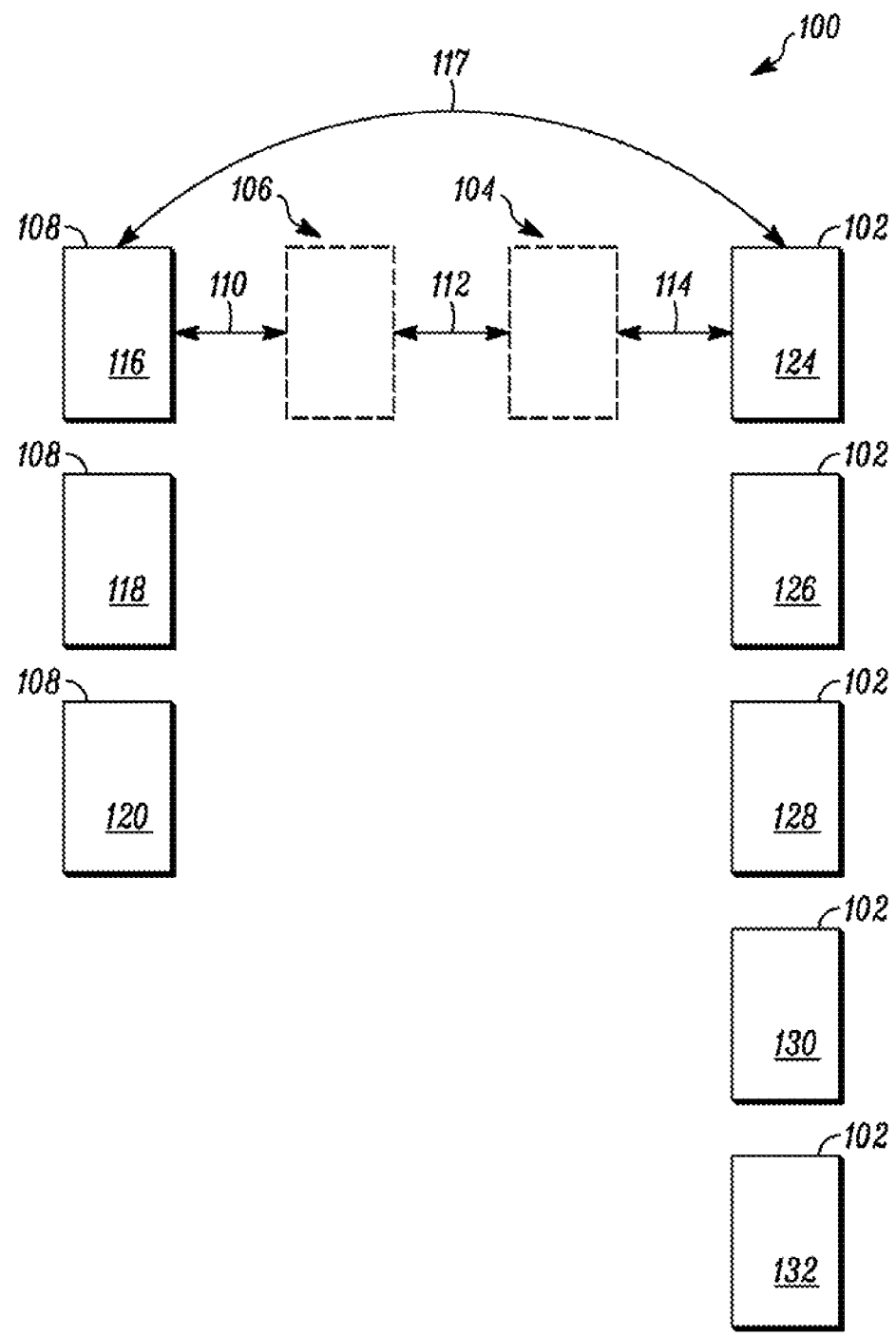
FIG. 1 is a block diagram showing an example communications system involving a plurality of media presentation devices in communication with a plurality of media content sources via a pair of intermediary web servers.

Referring to FIG. 1, a block diagram shows an example media communications system 100 in a simplified schematic form. As shown, the media communications system 100 includes in this embodiment multiple (in this exemplary diagram, five) media presentation devices 102. Each of the media presentation devices 102 is capable of receiving media content of one or more types and, in turn, displaying, outputting or otherwise facilitating a user's consumption of the media content. To receive the media content, each of the media presentation devices 102 is capable of communications with a registration/signaling control cloud ("RSC cloud") 104, which in turn is capable of communications with a video transport and delivery cloud ("VTD cloud") 106. The VTD cloud 106 additionally is capable of communicating with, and particularly capable of receiving media content from, one or more of a plurality of media content sources 108.

Each of the VTD cloud 106 and the RSC cloud 104 can be a server and, in the present embodiment, each of the clouds 104, 106 is a respective web server (e.g., a server that supports internet protocols or otherwise is capable of interaction with the internet or World Wide Web). Nevertheless, a cloud not only can be understood to refer to a single server but also can be understood to encompass a collection of multiple servers that are in communication with one another. In at least some such embodiments, the cloud is a web server cloud having multiple servers that support Internet technologies for communication between entities. Further, in some embodiments, the cloud can support asynchronous push operations in which information is pushed from the cloud (or from its one or more servers) to a client (or clients) using web 2.0 functionality and beyond (including, for example, further evolution of such functionality and/or new push functionality). Additionally, in some embodiments, the cloud is capable of supporting and creating services and applications for registration, storing and relaying client capabilities and/or preferences (among other things).

More particularly, communications between the media content sources 108 and the VTD cloud 106 occur by way of one or more communication links 110, while communications between the VTD cloud 106 and the RSC cloud 104 occur by way of one or more communication links 112. Additionally, communications between the RSC cloud 104 and one or more of the media presentation devices 102 occur by way of one or more communications links 114. Although FIG. 1 shows only one of each of the communication links 110, 112 and 114, it will be understood that any arbitrary number of communication links can be present in any given embodiment. Among other things, the communication link 114 can be understood to be representative of multiple communication links between the RSC cloud 104 and each of the media presentation devices 102, while the communication link 110 can be understood to be representative of multiple communication links between the VTD cloud 106 and each of the media content sources 108.

Thus, although in FIG. 1 only one of the media presentation devices 102 and one of the media content sources 108 are shown to be in communication with the RSC cloud 104 and the VTD cloud 106, respectively, it will be understood that depending upon the time or operational circumstance, any or all of the media presentation devices 102 and/or any or all of the media content sources 108 can be in communication with the clouds 104 and 106, respectively. It should further be noted that, although in the present embodiment communications between the media content sources 108 and the media presentation devices 102 largely or entirely occur via the RSC cloud 104 and the VTD cloud 106, depending upon the embodiment (or upon the time or operational circumstance) one or more of the media content sources 108 can directly communicate with one or more of the media presentation devices 102 by way of one or more direct communication links 117 (one of which is shown in FIG. 1).

The media content sources 108 are intended to be representative of any of a variety of different types of sources or suppliers that are capable of providing media content of any of a variety of types. In the present exemplary embodiment of FIG. 1, the media content sources 108 include first and second content provider websites (CPWs) 116 and 118, respectively. CPWs can be understood as encompassing social networking websites (SNWs), news feeds, video broadcast or other broadcast sources, music and photograph websites, as well as other types of websites such as business-to-business (b2b) or business-to-consumer (b2c) websites, or other interactive websites that allow for the downloading (and/or uploading, e.g., posting) of various forms of data. Examples of CPWs include, for example, Facebook™, MySpace™, hi5™, LinkedIn™, and Twitter™, youtube.com, hulu.com, as well as sources of RSS or other news feeds, photograph services such as Picasa™ or Photobucket™, and music services such as LastFM™.

In addition to the CPWs 116, 118, the media content sources 108 also include a further source 120 that can be, for example, any of a television station with digital media infrastructure (e.g., standard-definition television (SDTV), high-definition television (HDTV), personal digital video recorder (DVR) service, network-based DVR service, or other video services infrastructure that is capable of Internet-based communications for signaling and real-time media transport), a proprietary network, a database, or another type of source. It should be noted that, in at least some embodiments, sources of types corresponding to the further source 120 (rather than the CPW(s) 116 and 118), as well as any adaptive transcoders associated with such types of sources, constitute the primary sources for content delivery. Further it should be noted that, while FIG. 1 shows the media content sources 108 as including the CPWs 116, 118 and further source 120, depending upon the embodiment, any arbitrary number of media content source(s) can be providing media content and be in communication with the VTD cloud 106. Further, in at least some embodiments, the media communication system 100 with its cloud infrastructure provides web 2.0 services, including for example social networking aggregation services.

Additionally, just as the media content sources 108 can take a variety of forms depending upon the embodiment, the media content provided from those media content sources can take a variety of forms including, for example, time sequenced live or stored multimedia content (e.g., videos, music, photos or pictures, line and/or video on demand (VOD) content, songs, television programs, text entries, etc.), blog postings, messaging (e.g., short Message Service (SMS), Multimedia Messaging Service (MMS), and Instant Messaging (IM)), news reports, weather, personal, business, and/or other information and a variety of other types of data. For example, media content provided by CPWs such as the CPWs 116, 118 can encompass a variety of forms of data, such as videos, pictures, and songs (which in the case of SNWs can facilitate the creation and maintaining of interpersonal connections among persons and groups of persons), as well as personal and/or business information including, for example, information concerning contacts or friends such as contacts lists, new friends or updated contacts, special messages, news, happenings, and other types of information including possibly files such as image files or text files or other forms of data.

It should be noted that, in at least some embodiments, while the media content can be owned by operators/third parties such as those associated with the media content sources, distribution of the media content by the clouds 106, 104 is controlled by the owner of the clouds.

As for the media presentation devices 102 shown in FIG. 1, these are intended to be representative of a variety of different types of devices that are capable of receiving media content and displaying, outputting or otherwise facilitating the consumption or utilization of media content. The media presentation devices 102 generally can be understood to encompass, for example, one or more of each of stationary devices (such as televisions and media consoles with set top boxes capable of consuming digital content) as well as mobile devices. In many embodiments, the media presentation devices 102 generally encompass a number of in-home media consumption/ generation devices.

In the present embodiment, the media presentation devices 102 are particularly shown to include two stationary devices, namely, a television having an internet protocol (IP) set top box 124 and a personal computer 126, and additionally first, second, and third mobile devices 128, 130, and 132, which respectively are a smartphone or personal digital assistant (PDA), an in-car gaming/video console IP client, and an internet connected gaming device. Notwithstanding the particular stationary devices 124 and 126 shown in FIG. 1, these media presentation devices are intended to be representative of a variety of different types of stationary devices that can be present depending upon the embodiment including, further for example, personal computers, video walls, in-home digital media display systems, other (that is, other than televisions) in-home devices with video capable screens connected via IP set top boxes, etc.

Likewise, notwithstanding the particular mobile devices 128, 130, 132 shown in FIG. 1, these mobile devices are intended to be representative of a variety of different types of mobile devices that can be present depending upon the embodiment such as, for example, cellular telephones, smart phones, other types of handheld devices such as other forms of smartphones/personal digital assistants or (further for example) netbooks, e-readers, e-books, tablet devices, navigation devices with video capable screens, multimedia docking stations, PMPs (personal media players), DVRs (digital video recorders), personal DVR players, internet-connected gaming devices or other gaming devices (again, for example, some in-car gaming devices), video console IP client devices, and/or other devices such as laptop computers or notebook computers, including such computers that are capable of connecting to and communicating with a network, as well as network connected television and three-dimensional television (3D-TV) sets/devices. It should be understood that, depending upon the embodiment, some of the aforementioned media presentation devices (e.g., a personal computer such as the computer 126) and/or other media presentation devices not mentioned above can be considered mobile device(s) and/or stationary device(s) depending upon the devices' specific features, the devices' operational context, or the devices' manner of use.

While the media presentation devices 124-132 are representative of possible media presentation devices, the particular media presentation devices shown in FIG. 1 are not intended to be exhaustive of all possible media presentation devices that can be present depending upon the embodiment. Although five media presentation devices 124-134 are shown in FIG. 1, in other embodiments any arbitrary number of media presentation device(s) can be present, albeit typically at least two different media presentation device(s) are present so as to allow for switching from one media presentation device to another media presentation device (in terms of which device is displaying, otherwise outputting, or otherwise facilitating consumption of the media content), as discussed further below. That said, the present invention also has applicability in at least some embodiments to circumstances where there is only a single media presentation device—for example, some embodiments of the present invention allow for the pausing of media content being provided to a given media presentation device followed by the subsequent restarting at a later time the delivery of the media content to that same media presentation device even if a second media presentation device is not available for switching. Further, although the media presentation devices 124-132 include the particular three mobile devices 128-132 mentioned above, depending upon the embodiment any arbitrary number of mobile device(s) (including possibly no mobile devices at all) are present.

Depending upon the embodiment, the communication links 110, 112, 114 can be part of a single network or multiple networks. Each of the communication links 110, 112, 114 can include one or more wired and/or wireless communication pathways, for example, landline (e.g., fiber optic, copper) wiring, microwave communication, radio channel, wireless path, intranet, internet, and/or World Wide Web communication pathways, and which can employ numerous intermediary hardware and/or software devices such as, for example, one or more routers, cell towers, access points, other servers or any of a variety of remote device(s).

In addition, a variety of communication protocols and methodologies can be used to conduct the communications via the communication links 110, 112, 114 between the media presentation devices 102, media content sources 108, RSC cloud 104 and the VTD cloud 106, including for example transmission control protocol/internet protocol (TCP/IP), extensible messaging and presence protocol (XMPP), file transfer protocol (FTP), Real Time Streaming Protocol (RTSP) and adaptive live streaming mechanisms such as Hypertext Transfer Protocol (HTTP) live streaming, Microsoft smooth streaming, and flash streaming (e.g., in accordance with the Real Time Messaging Protocol (RTMP), RTMP Tunneled (RTMPT), RTMP Secure (RTMPS) or Encrypted RTMP (RTMPE)), etc. In the present embodiment, in which the VTD cloud 106 and RSC cloud 104 are both web servers, all of the links 110, 112, 114 involve web-based communications. Nevertheless, in other embodiments, other types of communication links for facilitating the transfer of signals among the media presentation devices 102, the RSC cloud 104, the VTD cloud 106, and the media content sources 108 are utilized instead of, or in addition to, web-based communications.

The operations of the RSC cloud 104 and the VTD cloud 106 as intermediaries between the media presentation devices 102 and the media content sources 108 are discussed in further detail below. In particular, interactions among the media presentation devices 102 and the clouds 104, 106 that allow for a media presentation (or other utilization) to be switched between different ones of the media presentation devices depending upon a user's circumstance are discussed in further detail. Although in the embodiment of FIG. 1 the RSC cloud 104 and the VTD cloud 106 are two distinct web servers that are in communication with one another, it should also be noted that in some alternate embodiments the two clouds can be combined into a single overall device (e.g., a single server or web server) that performs all of the functions of both clouds. In such embodiments, the communication link(s) 112 need not be present.

Although it should be emphasized that the media presentation devices 102 need not be limited to mobile devices (for example, in some embodiments one or more of the media presentation devices are or include stationary devices), as noted above one or more of the media presentation devices often will be mobile devices. That being the case, referring to FIG. 2, there is provided a block diagram illustrating example internal components 200 of a representative one of the media presentation devices 102 that in this example is a mobile device such as the smartphone/PDA 128 of FIG. 1. As shown, the components 200 include one or more wireless transceivers 202 (it being understood that, in some other embodiments, wired transceivers can also or instead be present), a processor 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208, such as a display, and one or more of the input devices 210, such as a keypad or touch sensor. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. All of the internal components 200 can be coupled to one another, and in communication with one another, by way of one or more internal communication links 232 (e.g., an internal bus).

Each of the wireless transceivers 202 utilizes a wireless technology for communication, which can include for example (but are not limited to) cellular-based communication technologies such as analog communications (using AMPS), digital communications (using CDMA, TDMA, GSM, iDEN, GPRS, EDGE, etc.), and next generation broadband communications (using UMTS, WCDMA, LTE, IEEE 802.16, etc.) or variants thereof, or peer-to-peer or ad hoc communication technologies such as HomeRF (radio frequency), Bluetooth and IEEE 802.11 (a, b, g or n), or other wireless communication technologies such as infrared technology. In the present embodiment, the wireless transceivers 202 include a cellular transceiver 203 and a wireless local area network (WLAN) transceiver 205, although in other embodiments only one of these types of wireless transceivers (and possibly neither of these types of wireless transceivers) is present, and/or one or more other types of wireless transceivers (e.g., a GPS transceiver, Ethernet transceiver or other broadband transceiver) is/are present.

By virtue of the use of the wireless transceivers 202, the smartphone/PDA 128 (mobile device) is capable of communicating with the RSC cloud 104 and indirectly with the VTD cloud 106, and thus also is capable of communicating indirectly with the media content sources 108. Also, by virtue of the wireless transceiver 202, in some alternate embodiments the PDA 128 (mobile device) is able to communicate directly with one or more of the media content sources 108 (e.g., by way of one of the communication links 117). Further for example, operation of the wireless transceivers 202 in conjunction with others of the internal components 200 of the mobile device 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208.

Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals by way of wireless and (possibly wired as well) communication links to other devices such as the RSC cloud 104 and the VTD cloud 106. Thus signals can be provided also indirectly to one or more of the media content sources 108 (as well as directly, in the event communication links such as the communication link 117 are employed). In at least some embodiments, signals from the wireless transceiver 202 are communicated to the RSC and VTD clouds 104, 106 (and media content sources 108) by way of additional intermediate devices such as a cell tower, access point, or another server or any of a variety of remote device(s), which as discussed above can be considered part of the communication links 110, 112, 114.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 among other things can include a video screen. Likewise, by example, the input device(s) 210 can include one or more visual input devices 222 such as an optical sensor (for example, a camera), one or more audio input devices 224 such as a microphone, and one or more mechanical input devices 226 such as a flip sensor, keyboard, keypad, selection button, navigation cluster, touch pad, touchscreen, capacitive sensor, motion sensor, and switch. Actions that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

Figure 2:
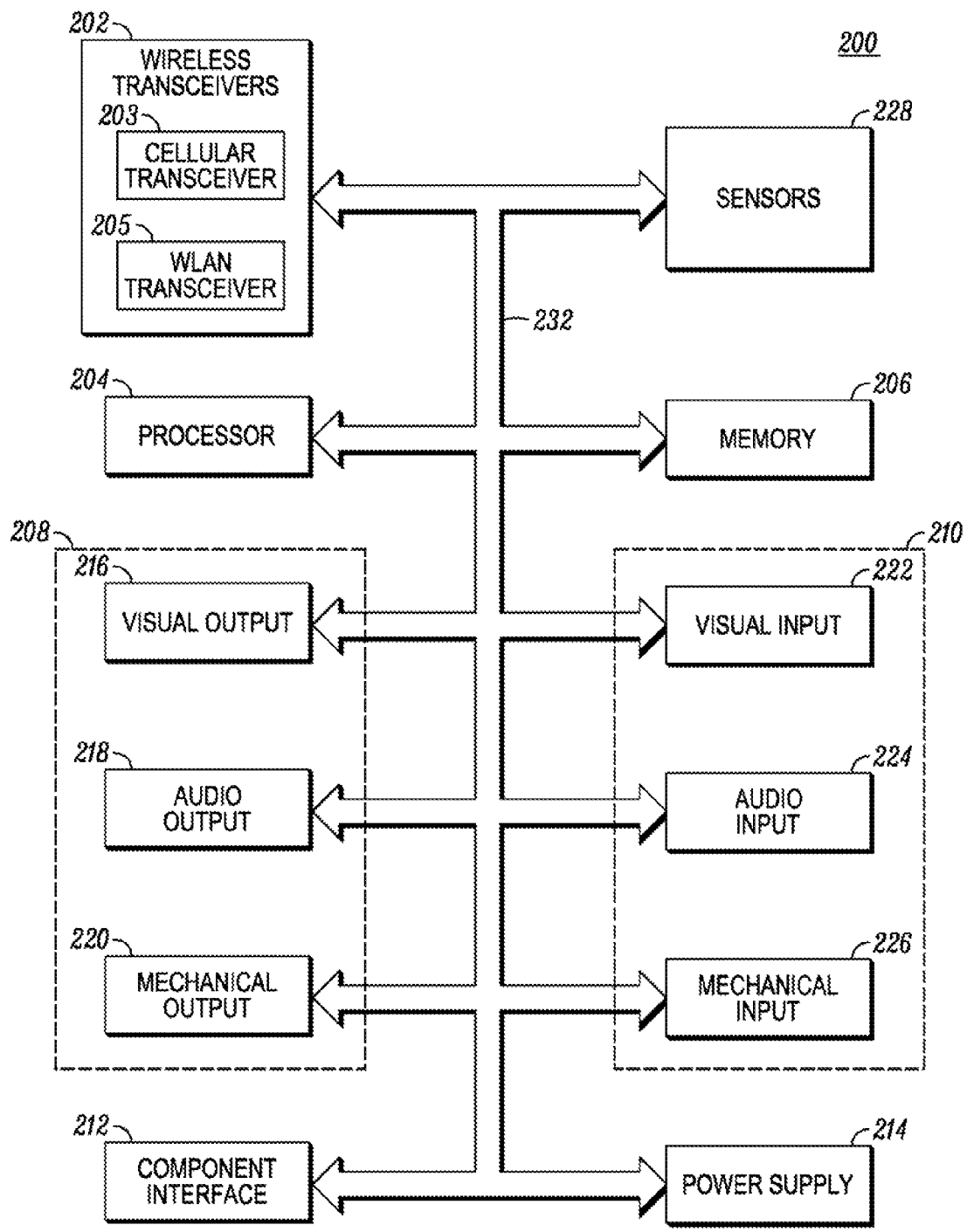
FIG. 2 is a block diagram showing example components of one of the media presentation devices of FIG. 1.

As shown in FIG. 2, the internal components 200 of the PDA 128 (mobile device) also can include one or more of various types of sensors 228. The sensors 228 can include, for example, proximity sensors (a light detecting sensor, an ultrasound transceiver or an infrared transceiver), touch sensors, altitude sensors, or a location circuit that can include, for example, a Global Positioning System (GPS) receiver, a triangulation receiver, an accelerometer, a tilt sensor, a gyroscope, or any other information collecting device that can identify a current location or user-device interface (carry mode) of the PDA 128.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include, but need not be limited to, operating systems, applications, and informational data. Each operating system includes executable code that controls basic functions of the communication device, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Figure 3:
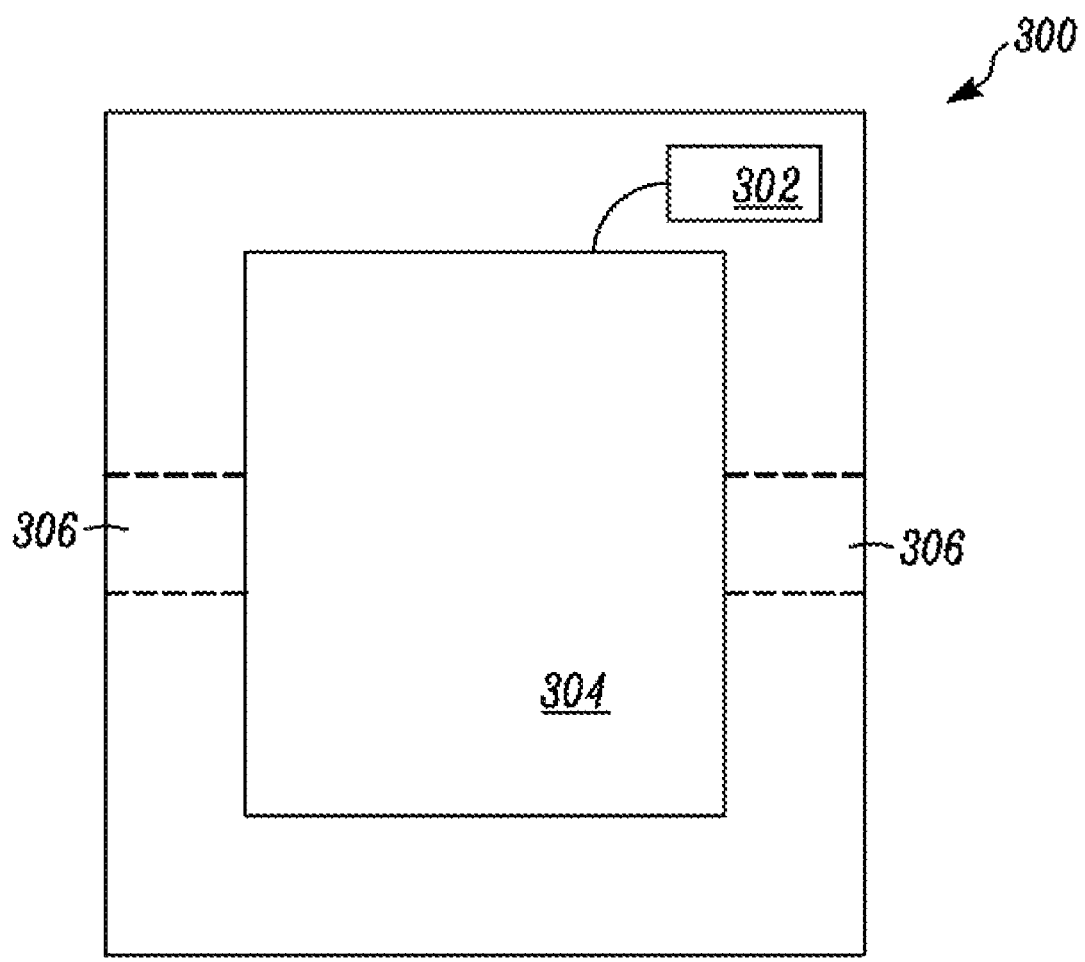
FIG. 3 is a block diagram showing example components of one of the intermediary web servers of FIG. 1.

As noted above, in the present embodiment, each of the RSC cloud 104 and the VTD cloud 106 is a web server. Referring next to FIG. 3, example components of a web server 300, which can serve as each of the RSC cloud 104 and the VTD cloud 106, are shown in a figurative manner. As shown, the web server 300 includes a memory portion 302 and a processor portion 304 in communication with that memory portion, and one or more input/output (I/O) interfaces 306 that allow the web server 300 to communicate with other external devices by way of appropriate ones of the communication links 110, 112 and 114 (e.g., the communication links 112 and 114 in the case of the RSC cloud 104, the communication links 110 and 112 in the case of the VTD cloud 106). As noted above, in some alternate embodiments, the RSC and VTD clouds 104, 106 can be combined into a single device and, in some such embodiments, a single one of the web server 300 could provide the functionality afforded by the both of the clouds 104, 106 (in such embodiments, the web server would communicate with other external devices by way of the communication links 110 and 114).

Figure 4:
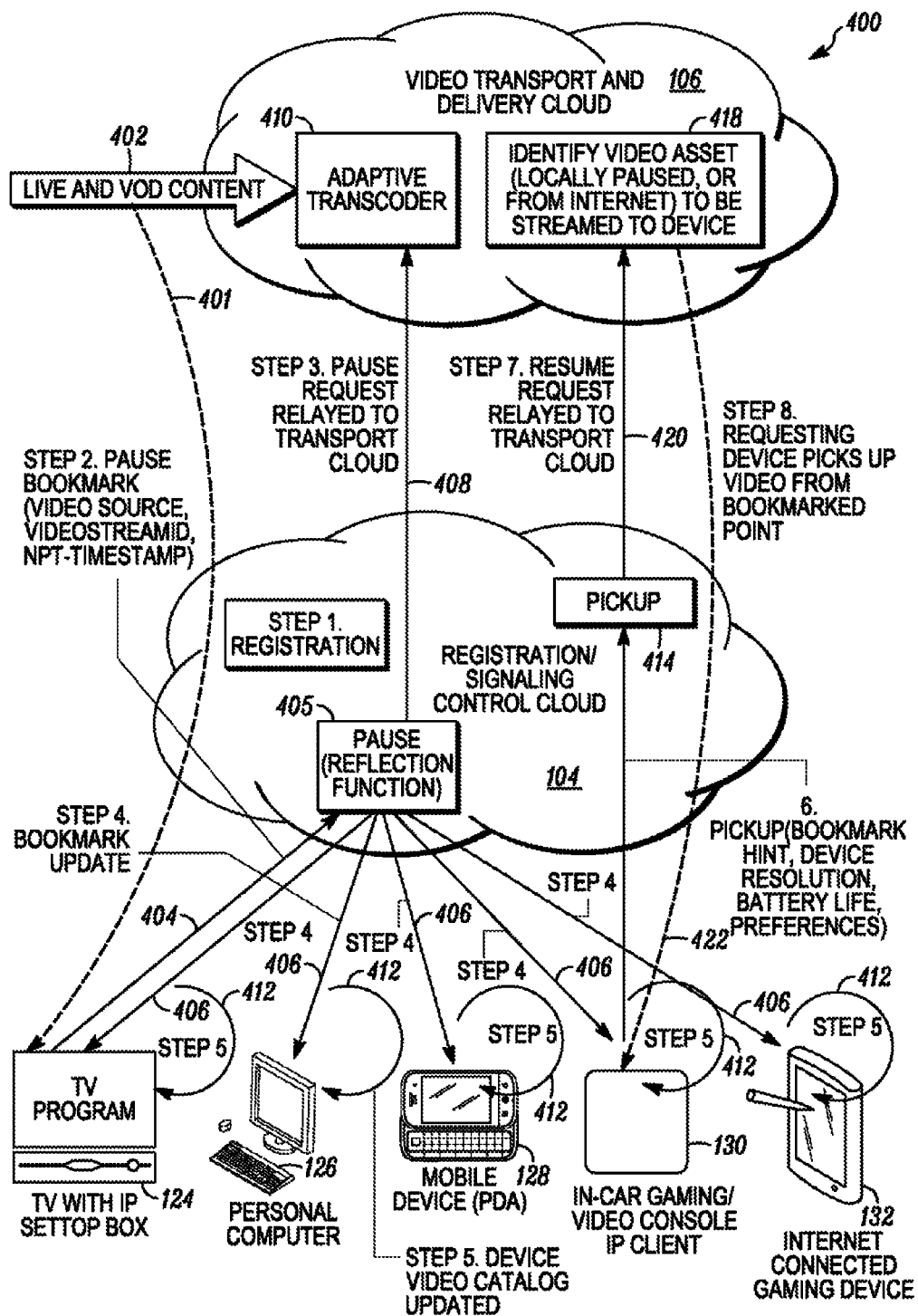
FIG. 4 is a schematic diagram showing various example steps of operation of the communication system and particularly the intermediary web servers and media presentation devices of FIG. 1.

Turning to FIG. 4, portions 400 of the communication system 100 of FIG. 1 are shown in another schematic manner so as to illustrate exemplary interactions among, and operations of, several of the components of the communications system. In particular, FIG. 4 shows the VTD cloud 106 as well as the RSC cloud 104 along with the five media presentation devices 124-132 in communication with one another (albeit the communication links 114 and 112 are not expressly shown). An arrow 402 pointing towards the VTD cloud 106 is indicative of the fact that the cloud 106 is capable of receiving various types of media content from media content sources such as (but not limited to) the media content sources 108 of FIG. 1, although those sources are not explicitly shown in FIG. 4. As noted above, the media content received by the VTD cloud 106 can take a variety of forms.

As illustrated generally by FIG. 4, the VTD cloud 106 is where the video content or other media content is served from for use by the media presentation devices 124-132. The content can physically reside at the VTD cloud 106 upon being received from the media content sources, particularly for example within the memory 302 of the web server 300 acting as the VTD cloud (or another component of the web server, such as an encoder), or alternatively the VTD cloud 106 simply serves as a pass-through intermediary allowing for or facilitating communications between the media content sources and the media presentation devices. The VTD cloud 106 performs functions that are appropriate for allowing the serving of the media content including, for example, reformatting functions, transcoding functions, and streaming functions. The VTD cloud 106 also serves the media content based on the needs of the media presentation devices 124-132 as communicated from those devices, potentially by way of the RSC cloud 104.

By comparison, the RSC cloud 104 aggregates and appropriately processes and uses information from the media presentation devices 124-132, including preferences associated with those devices, and also information regarding signals provided from the media presentation devices as to what types of functions are desired (e.g., pausing of a video, pick up, fast forward, or rewind). The RSC cloud 104 also communicates specific connections with the VTD cloud 106 and thereby serves as an intermediary between the media presentation devices 124-132 and the VTD cloud 106. Bids of the media presentation devices 124-132 for media content as discussed above can also be provided to the VTD cloud 106 by way of the RSC cloud 104. As discussed in further detail below, session control (e.g., the pausing and resuming of the displaying of video media content) and related bookmark metadata management can be performed by way of web 2.0 services and an appropriate push mechanism from the RSC cloud 104.

Separation of the VTD cloud 106 from the RSC cloud 104 as is provided in the embodiment of FIG. 4 can be valuable in at least some embodiments insofar as, given such an arrangement, the video transport functions can exist outside of the signaling cloud functions. For example, currently updates from various SNWs such as Facebook or Twitter (or email) are provided directly from those media content sources 108. The RSC cloud 104 in turn aggregates status updates and other feeds/signaling associated with SNWs. With such an arrangement, among other things, an enhanced video or integrated video experience can be provided to consumer(s) using the media presentation devices by using bookmark metadata information (as discussed further below). Such an enhanced video experience can include not only video content but also include or be combined with social networking aggregation functionality such as, for example, advertisements, social networking status updates, friends' comments including comments and/or ratings on specific video streams, online polling features to present relevant information to a user, and a variety of other enhanced services that integrate video content with relevant social networking information aggregated by and provided from the RSC cloud 104.

Notwithstanding the above-described operational benefits that can be achieved by utilizing two distinct clouds such as the VTD cloud 106 and RSC cloud 104, in some alternate embodiments the functionality performed by the VTD cloud 106 and RSC cloud 104 can be performed by a single cloud (or web server or other computer). Further, it should also be understood that (regardless of whether two clouds or a single cloud are employed), depending upon the embodiment or circumstance video delivery to media presentation device(s) can be by way of one-on-one unicast communication or one-to-many multicast communication. One-to-many multicast communication is appropriate, for example, where the media content (e.g., after "resuming" the providing of that content) is to be simultaneously consumed on multiple ones of the media presentation devices 102.

FIG. 4 further illustrates exemplary steps of operation of the portions 400 of the communications system 100. More particularly, these steps allow for a user to cause media content (in this case, video media content) being displayed by one of the media presentation devices 124-132 to be paused and switched so as to be displayed on another one of the media presentation devices determined by that user, such that the user can experience the media content without interruption (or with only minimal interruption, e.g., interruption due to the physical movement of the user from one location to another location). As shown in FIG. 4, the process begins at a first step (step one) represented by a box 403, during which takes place the registration of all of the media presentation devices 124-132 that are associated with the user with the RSC cloud 104. Although the first step is represented figuratively by the box 403 for simplicity, it should be understood that the performance of this step involves communications from the media presentation devices 124-132 to the RSC cloud 104 allowing for various registration information to be provided to the RSC cloud 104. In at least some embodiments, such registration communications are provided in accordance with HTTP or the session initiation protocol (SIP).

Such registration information can include any of a variety of different types of information including, for example, user name, account name, video codecs supported information, device capabilities information (e.g., resolution information pertaining to the device display or other video processing capabilities information) and/or other video consumption preferences associated with each media presentation device. In some embodiments, the registration step 403 (step 1) is precipitated by each of the media presentation devices 124-132, for example, when those devices first are turned on or enter into communications with the RSC cloud 104. Also, in some embodiments, the registration step 403 can occur in response to a manual command provided by a user to the respective media presentation device. Further, in at least some embodiments, by virtue of receiving the registration information during the first step, the RSC cloud 104 can thereafter manage each user's registration and particularly the media presentation devices (e.g., video capable end points) associated with that user through basic HTTP capability.

Once a media presentation device such as any or all of the media presentation devices 124-132 have been registered with the RSC cloud 104, it is possible for those devices to receive video signals. For example, the set top box 124 can be assumed to be receiving and displaying video media content at a time sometime after the time at which that media presentation device has been registered with the RSC cloud 104. As represented by an arrow 401, a media content signal including the video media content (or other media content) is received by the set top box (media presentation device) 124 after being sent from the VTD cloud 106, which will have received that video media content from one or more of the media content sources 108. As discussed above, the media content signal (video feed) can be reflective of video information that is stored at the VTD cloud 106 after having been received at an earlier time from one or more of the media content sources 108, or instead can be video media content that is being transmitted at that time from one or more of the media content sources via the VTD cloud 106 to the media presentation device 124.

While FIG. 1 suggests that video media content (or other media content) proceeds to media presentation devices such as the media presentation device 124 from the VTD cloud 106 by way of the RSC cloud 104, that is, by way of the communication links 112 and 114 (that is, after having been passed to the VTD cloud 106 by way of the communication links 110), this need not always be the case. Rather, in some alternate embodiments, the video media content need not pass through the RSC cloud 104 on its way from the VTD cloud 106 to a given one of the media presentation devices such as the media presentation device 124, but instead can be provided directly from the VTD cloud 106 to the media presentation device 124. In such embodiments, it will typically be the case that, after being registered with the RSC cloud 104, a media presentation device will be able to receive the video media content directly from the VTD cloud 106 after the RSC cloud 104 has provided appropriate information to the VTD cloud 106 allowing for such direct transmission to occur.

At some point during the displaying of the video media content by the media presentation device 124, the user consuming or observing the video media content determines that circumstances have changed such that the user can no longer continue to observe the video media content at that media presentation device, for example, because the user needs to move to a different location where it is no longer appropriate to use that media presentation device or for another reason such as the possibility that that media presentation device may need to be used for a different purpose. When the circumstance occurs, the user provides a command to the media presentation device 124 requesting that the video be paused. In response, as shown in FIG. 4, the media presentation device 124 in turn sends a pause/bookmark message to the RSC cloud 104 at a step two (although FIG. 4 does not illustrate the operation in which the media presentation device 124 receives the user pause command, such operation can be considered as encompassed within step two). The pause instruction provided from the media presentation device 124 to the RSC cloud 104 at the step two, which is represented by an arrow 404, is received by the RSC cloud 104 particularly at a pause (reflection function) block 405 of the cloud, which can be considered a portion of the processor 304 of FIG. 3.

In at least some embodiments, the pause command provided by the set top box 124 (or other ones of the media presentation devices 124-132) includes a video content bookmark in the form of metadata that is received by the RSC cloud 104. The pause command/bookmark can be sent by way of a combination of SIP and HTTP methods. The metadata included in the pause command/bookmark in turn can include various types of information such as, for example, video content source identifier information, an identification of a block of the video stream at which the video was paused (including but not limited to a NPT time value or other form of time stamp, a frame/block ID or other indicator of a position within a video stream, an asset ID, a user identifier, or a link to a thumbnail of content ID). The pause command communication to the RSC cloud 104 therefore is significant not only in that it communicates a request that the video signal be paused but also identifies a location within the video media content at which the video is being paused, such that the system can appropriately restart the video at that location when that video is being displayed on a different one of the media presentation devices 124-132.

Further, in some embodiments, the pause command/bookmark signal sent during step two includes information specifying the identity of the media presentation device (or devices) to which the media content should be provided in the future subsequent to the bookmark location, that is, the media presentation device (e.g., the IP client 130) to which the media content should be switched after being paused at the present media presentation device (the set top box 124). This identity information can be specified by a user who is controlling the media presentation device (again, the set top box 124) at which the media content is being paused.

The pause block 405 upon receiving the pause request with the video content bookmark in turn causes the performing of two actions shown in FIG. 4 as steps three and four corresponding to arrows 408 and 406, respectively. In the present embodiment step three is performed prior to step four albeit, for purposes of explanation the two steps are described below in reverse order. With respect to step four in particular, this entails distribution of the bookmark information to each of the other media presentation devices 126-132 that are associated with the user (which were registered during step 1). That is, the bookmark information is redirected/reflected by the pause block 405 to all the other ones of the media presentation devices 102 associated with the user immediately. This function can be achieved particularly by way of using a push channel mechanism available at the RSC cloud 104. Thus, as shown in FIG. 4, and represented by several of the arrows 406, the bookmark information is distributed to each of the media presentation devices 126-132 other than the media presentation devices 124 at which the video content was already being displayed and was paused. Consequently, each of the media presentation devices 126-132 receives information concerning the location within the video content at which it was paused by the user during display at the set top box 124.

It should be noted that FIG. 4 also shows one of the arrows 406 to be directed back to set top box 124, thus indicating that the bookmark information is returned to that device as well, and thus allowing for confirmation that the proper bookmark information was received at the pause block 405 for submission to the media presentation devices 126-132. Providing of this communication back to the set top box 124 further makes it possible to resume content flow to the set top box (that is, resume content flow to the same media presentation device from which the pause/bookmark request message originally emanated) at a later time as appropriate.

The exact content of the bookmark information sent by the pause block 405 to the media presentation devices 102 can vary depending upon the embodiment. In some embodiments, as discussed in further detail below, the bookmark information can include video catalogue/program guide information. That is, in some embodiments, the bookmark information can include both the bookmarks of previously viewed user content along with new available content that are presented to the user in a combined enhanced program guide ("EPG") that is sent to all of the media presentation devices 102 registered by the user. In some such embodiments, all of this information is pushed from the RSC cloud 104 to the media presentation devices 102. That is, the pushing feature can be important in terms of pushing both media content bookmarks and EPG to the media presentation (client) devices.

In addition to the step four, at which the bookmark information is reflected to each of the media presentation devices 124-132, at the step three the pause request is further communicated from the RSC cloud 104 to the VTD cloud 106, as represented by an arrow 408. As shown in FIG. 4, the pause request transmitted from RSC cloud 104 to the VTD cloud 106 particularly is received by an adaptive transcoder represented by a block 410, which can be considered part of the microprocessor 304 of the VTD cloud 106. As a result of the receipt of the pause request by the adaptive transcoder at the VTD cloud 106, the VTD cloud ceases transmitting the media control signal represented by the arrow 401, and consequently the set top box 124 cease receiving additional video media content. In alternate embodiments, the media control signal continues to be transmitted by the VTD cloud 106 regardless of its receipt of the pause request but, upon the sending of the pause command at the step two, the set top box 124 stops receiving that signal or stops utilizing (e.g., displaying) the additional information being provided by that signal.

Encompassed within the pause request transmitted from the RSC cloud 104 to the VTD cloud 106 in step three is bookmark information including information on device resolutions of all the registered media presentation devices 124-132. By virtue of receiving such information, the VTD cloud 106 is able to locate (or generate) the appropriate video source (e.g., the location of the appropriate video media content stored in the memory 302 of the VTD cloud, or possibly an appropriate one of the media content sources 108) corresponding to the video media content that has been paused and to which the bookmark information pertains. Upon locating the appropriate video source, the bookmark information (or a portion thereof) is placed in/stored as part of the video media content such that the bookmark information can later be accessed when that video media content is requested by one of the media presentation devices.

The adaptive transcoder (block 410) is the portion of the VTD cloud 106 that is particularly responsible for changing video code from one format to another (e.g., wide screen to non-wide screen) to suit a given media presentation (video receiving) device. In some circumstances, the adaptive transcoder also outputs video code in multiple formats so that multiple media presentation devices can receive video media content at the same time (e.g., multi-casting). For example, suppose the adaptive transcoder (block 410) receives digital subscriber line (DSL) media content, which is suitable for certain of the media presentation devices 102 which accept high resolution video data (e.g., the set top box 124) but not others that prefer low resolution video data (e.g., the PDA 128). Further supposing that it is the low resolution video data that is needed (e.g., for use by the PDA 128), the adaptive transcoder can either process the incoming video signal to generate the desired low resolution video signal or alternatively obtain the appropriate low resolution information from a different location (e.g., a different media content source such as hulu).

The information transmitted from the RSC cloud 104 to the adaptive transcoder of the VTD cloud 106 in step three can include, in some embodiments, not only the contents of the bookmark but also additional information (which can be referred to as "augmented bookmark information") such as information regarding active device preferences (e.g., user preferences) and/or device registration information. Such augmented bookmark information can be particularly helpful in allowing the adaptive transcoder (block 410) to perform the functions of getting video streams in the correct codec and time format. Further, the augmented bookmark information in at least some circumstances is utilized by the adaptive transcoder to determine the appropriate source of desired media content, and/or can be utilized by the adaptive transcoder to determine whether an "augmented bookmark" set with respect to one format of video data corresponds to a given location within video data for the same video asset that is in a different format.

In some embodiments, the adaptive transcoder can additionally take into account condition/preference information regarding the media presentation devices and adjust the format of the media signal(s) provided to those media presentation device(s) accordingly. For example, the adaptive transcoder can be informed about characteristics such as the battery life and resolution suitable for each given media presentation device, which allows the adaptive transcoder to make a judgment about what format is important.

Additionally, upon receiving the bookmark information during step four, at a step five each of the media presentation devices 124-132 in turn updates a video catalogue application or program guide as stored or running on that respective media presentation device, as represented by further arrows 412. In particular, the video catalogue application is updated with a listing of the video asset (e.g., the video media content pertaining to a particular discrete video or program) to which the bookmark information pertains, as well as the video bookmark information itself (that is, where a bookmark has been placed in the video). It should be understood that the video catalogue application can be, but need not always be, the same for each of the media presentation devices associated with a given user. It should further be noted that a given video asset (or other media asset) can include more than one bookmark after it has been paused by more than one media presentation device or paused more than one time.

In alternate embodiments, the video catalogue application for each of the media presentation devices 124-132 can be maintained on an ongoing basis at the RSC cloud 104 and then provided/sent to each of the media presentation devices when appropriate. In some such embodiments, the RSC cloud 104 can serve up video catalogues/program guides using standards-based IP transport mechanisms supported by the media presentation devices 102. A given video catalogue/program guide is typically sent to all of the media presentation devices 102 that are registered and online. Such a program guide downloaded to the media presentation devices can be referred to as an enhanced program guide ("EPG"). Depending upon the embodiment, an EPG can include various types of information that is pushed to the media presentation devices registered by the user. For example, an EPG can include the bookmarks of previously-viewed media content along with new available content that are presented to the user. In at least some embodiments, the pushing capability is particularly significant, in terms of pushing both media content bookmarks and other EPG information to media presentation (client) devices.

Subsequent to the performing of the aforementioned steps (and particularly the step two at which the pause request was communicated), the user may wish to cause the displaying of the video media content to be resumed at a different one of the media presentation devices 124-132 than the set top box 124—for example, as shown in FIG. 4, at the IP client 130. Thus, in a step six, upon the user wanting to resume the video transmission, a command from the user is provided to the media presentation device (IP client) 130 and consequently a pick up (or resume) signal is provided from that media presentation device again to a pick up portion 414 of the processor 304 of the RSC cloud 104, as represented by an arrow 416. It should be noted that, in some embodiments, the user provides the command to the media presentation device for the purpose of causing resumption of the media display by first browsing the EPG with the updated bookmarks (while at the media presentation device 130) and then, based upon this information, choosing to resume live, VOD or other media content. The exact form or content of the pick up signal (represented by the arrow 416) transmitted at the step six can vary depending upon the embodiment. While in some embodiments the pick up signal takes the form of a request or command (e.g., a request or command that displaying of video media content be resumed), in other embodiments the pick up signal takes some other form that is configured to precipitate a transmission of at least some media content (and/or additional information) so as to allow for a resumption of the media content transmission that was previously paused, from the location (or substantially the same location) at which the pausing occurred. In some cases, the pick up signal (the arrow 416) provided at the step six includes information such bookmark information (e.g., video asset name, block and time where content was paused, etc.) and/or other information such as preference information ("your preferences").

Such preference information can include, for example, user preferences and device preferences such as preferred settings or operational modes, device resolution, screen size/location, preferred content source, available memory and loading, preferred codecs, preferred bit rate information, information regarding remaining battery life (e.g., when a battery is the only power source for the media presentation device), or information regarding the location and/or devices/video sources in the vicinity. Given that such information is provided to the RSC cloud 104 (and from there can be further provided to the VTD cloud 106), the RSC cloud 104 and/or VTD cloud 106 can adjust their manners of operation so as to accommodate such user preferences, device preferences, or other issues (also, this information can be used as inputs to the RSC cloud 104/VTD cloud 106 for reserving paused content on alternative screens/devices). Ultimately, the user's experience at the media presentation devices 102 can be improved on a variety of levels including, for example, experiencing extended device performance (this can be achieved when device battery levels are taken into account).

After the pick up portion 414 has received the pick up signal, at a step seven an additional resume request signal represented by an arrow 420 is relayed from the pick up block 414 of the RSC cloud 104 to an additional block 418 of the VTD cloud 106. The additional block 418 can be again considered part of the microprocessor 304 of the VTD cloud 106. Although "augmented bookmark information" was already discussed above in relation to step three, it should be understood that in at least some embodiments it is at the present step seven (rather than, or in addition to, at the step three) that such augmented bookmark information is provided to the VTD cloud 106. Thus, a resume request signal provided at the step seven can include, among other things, relevant information such as device characteristics, click user preferences or other preferences (or device registration information). Among other things, such information is usable by the VTD cloud 106 for the purpose of serving appropriate video media content to the IP client 130 at which the user has requested the video media content be resumed. Also, as already discussed above, the VTD cloud 106 can use the augmented bookmark information to locate the source of the paused content, or to reformat data and plays content from NPT value on reformatted video asset. As already discussed, the video media content that has been requested (and was previously paused) can be video media content that is stored on the VTD cloud 106 or alternatively video media content that is obtainable from one of the media content sources 108.

Once the particular video asset that was paused at the media presentation device 124 and then requested at the media presentation device 130 has been identified, then at a step eight the video media content is delivered from the block 418 of the VTD cloud 106 to the requesting media presentation device (IP client) 130, such that the requesting device picks up the video media content from the bookmarked point (that is, at or substantially at the location within the media content at which the earlier pausing occurred). As represented by the arrow 422, the video media content can be streamed to the media presentation device 130 from the VTD cloud 106 by way of the RSC cloud 104 (again, by way of the communication links 112 and 114), albeit in other embodiments there can be a separate communication link established between the VTD cloud 106 and the media presentation device 130 that does not involve the RSC cloud 104 such that the video media content is sent directly from the VTD cloud to the media presentation device without passing through the RSC cloud. Upon receiving the video media content beginning at the point of the bookmark, the media presentation device 130 is capable of displaying that video to the user.

From the above description, it should be apparent that in at least some embodiments the media communication system employs the cloud services framework to enable pause and pick up of media content (including multi-media content such as streaming video content) across all eligible media presentation devices (e.g., devices with video screens) using the push framework that exists within the cloud framework. In at least some embodiments, aggregation functionality provided by the cloud framework particularly allows for the display of video media content on two, three or more screens of multiple devices (including the switching of the displaying from one screen to another). The use of the cloud framework alleviates the need for excessive complicated network equipment needed to achieve this experience. Depending upon the embodiment or circumstance, the cloud framework allows video (or other) media content to be served to the user (to a given media presentation device) either from the server (e.g., the VTD cloud) when the media content is stored there (e.g., for paused or time delay content) or from the media content source via the server when the media content should be provided directly to the media presentation device (e.g., for live content).

While the above description is intended to be representative of some embodiments, in other embodiments other or additional componentry and/or functionality can be provided. For example, in some other embodiments, the pause command/bookmark information related to the pausing of video can include, in addition to the types of information described above (e.g., regarding the point in a video at which the video was paused and information on the duration of the program that was already viewed), information regarding other online sources and value added services (e.g., ratings, other related video recommendations, related merchandize, games, movie soundtracks). All of these different types of information can be pushed from the RSC cloud to all the user devices with pause/bookmark metadata.

Further, it should be noted that, while it is envisioned that embodiments of the present invention are useful in enhancing consumers' personal experiences in terms of how consumers are able to experience media content (for example, in the consumers' personal homes or automobiles), it is further envisioned that embodiments of the present invention can also be implemented in a variety of additional contexts, including commercial, enterprise (business), or other "non-consumer" contexts. For example, embodiments of the present invention can be utilized to deliver medical information in hospital environments or to deliver building security/monitoring information to security guards (in such systems, the clouds 104, 106 can be owned by a medical information company or security company).

It is specifically intended that the present invention not be limited to the embodiments and illustrations contained herein, but include modified forms of those embodiments including portions of the embodiments and combinations of elements of different embodiments as come within the scope of the following claims.

I claim:

1. A method of enabling media content to be utilized by way of a plurality of media presentation devices including a first media presentation device and a second media presentation device, the method comprising:
   registering each of the media presentation devices with at least one cloud;
   receiving at a first cloud a first signal from the first media presentation device indicative of a request or command that a transmission of a media content signal by the at least one cloud be paused, the at least one cloud including the first cloud and the first cloud including at least one first server;
   sending a second signal from the first cloud to the second media presentation device, the second signal including bookmark information indicative of a location within the media content at which the media content signal has been paused, wherein the sending of the second signal is achieved by a push action taken by the first cloud;
   receiving a third signal from the second media presentation device, the third signal being indicative of a further request or command that the transmission of the media content signal from the at least one cloud be resumed; and
   resuming the transmission of the media content signal from the at least one cloud, wherein the resumed transmission is received by the second media presentation device, and wherein the media content signal provides a portion of the media content beginning at or substantially at the location indicated by the bookmark information.

2. The method of claim 1, wherein the push action taken by the first cloud is an asynchronous push action.

3. The method of claim 1, wherein during the registering of the media presentation devices, at least some information is provided to the at least one cloud regarding video processing capabilities of the media presentation devices.

4. The method of claim 1, wherein each of the media presentation devices is associated with a single user, and wherein the registering further includes registering at least one additional media presentation device with the at least one cloud.

5. The method of claim 1, wherein the at least one cloud includes the first cloud and a second cloud, and further comprising:
   sending an additional signal based at least in part upon the received first signal to the second cloud, wherein the second cloud includes at least one second server.

6. The method of claim 5, wherein the second cloud is capable of communication a plurality of external media content sources from which the second cloud receives the media content, wherein the second cloud in response to receiving the additional signal causes the transmission of the media content signal to be paused, and wherein the first cloud performs registration and signaling operations and aggregates status updates and other feeds or signaling associated with at least some content provider websites, and the second cloud performs transport and delivery operations.

7. The method of claim 6, further comprising:
sending a further signal based at least in part upon the received third signal to the second cloud, wherein in response thereto the second cloud causes the resuming of the transmission of the media content signal.

8. The method of claim 7, wherein an adaptive transcoder portion of the second cloud processes the media content signal before the media content signal is transmitted.

9. The method of claim 8, wherein the media content signal is processed by the second cloud so that the media content signal is suitable for use by one or more of a plurality of media presentation devices, the plurality of media presentation devices including the first and second media presentation devices.

10. The method of claim 5, wherein the second cloud determines a source of the media content before transmitting the media content signal, the source including one or more of (a) a memory device associated with the at least one cloud, and (b) an external media content source with which the second cloud is in communication.

11. The method of claim 1, wherein the at least one first server includes either a single server or a plurality of servers in communication with one another.

12. The method of claim 11, wherein the at least one first server includes the single server, and the single server is a web server.

13. The method of claim 1, wherein the media content includes one or more of video media content, audio media content, and graphics content including presentation information, and wherein each of the media presentation devices is either a mobile device or a stationary device.

14. The method of claim 1, wherein the media content is video media content that originated at a second cloud or at a video content provider, and further comprising:
modifying, at the second cloud, at least one aspect of formatting of the video media content so that the video media content is formatted in accordance with at least one characteristic or capability of the second media presentation device so as to be suitable for use thereby.

15. The method of claim 1, wherein the first signal also includes the bookmark information,
wherein the bookmark information includes one or more of video content source identifier information, a NPT time value, another form of time stamp, a frame/block ID, another indicator of a position within a video stream, an asset ID, a user identifier, and a link to a thumbnail of content ID, and
wherein the third signal includes preference information.

16. The method of claim 1, wherein the second signal additionally includes video catalogue information, and wherein the media content signal provides the portion of media content in a streamed manner.

17. A method of operating a media presentation device so as to perform a resumed displaying of video media content subsequent to a pausing of a previous displaying of the video media content, the method comprising:
sending a first signal to a first cloud by which the media presentation device is registered with the first cloud;
receiving a second signal from the first cloud at the media presentation device, the second signal including bookmark information indicative of a location within the video media content at which the pausing occurred, wherein the second signal received by the media presentation device is a push signal;
sending a third signal from the media presentation device, the third signal being indicative of a request or command to begin the resumed displaying or being configured to precipitate a transmission of at least a first portion of the video media content so as to allow for the resumed displaying;
receiving at the media presentation device the first portion of the video media content; and
performing the resumed displaying of the video media content based at least in part upon the received first portion of the video media content, the resumed displaying beginning at or substantially at the location.

18. The method of claim 17, further comprising:
updating a video catalogue or program guide stored at the media presentation device after receiving the second signal based upon at least some of the bookmark information included in the second signal.

19. The method of claim 18, wherein the push signal is an asynchronous push signal.

20. The method of claim 19, wherein the media presentation device is a mobile device,
wherein the third signal communicates one or more of a preference corresponding to a display of the mobile device, at least one video processing capability of the mobile device, a battery life remaining at the mobile device, and a physical location of the mobile device, and
wherein the mobile device is associated with a user who is also associated with another device at which the pausing of the previous displaying occurred.

21. The method of claim 17, wherein the media presentation device is one of a cellular telephone, a smart phone, a personal digital assistant, a laptop computer, an in-car gaming/video console IP client, an internet connected gaming device, a personal media player, a digital video recorder (DVR), a personal computer, a tablet device, a netbook, a in-home device with a video capable screen connected with an IP set top box, a personal DVR player, a navigation device with a video capable screen, a multimedia docking station, an in-home digital media display system, a video wall, an e-book, an e-reader, a network connected television, or a three-dimensional television set (3D-TV).

22. A system for enabling media content to be output by way of a plurality of media presentation devices, the system comprising:
a first cloud having a first server including a first processing device and a first memory device, the first cloud storing registration information received from the plurality of media presentation devices; and
a second cloud in communication with the first cloud, the second cloud having a second server including a second memory device and a second processing device including an adaptive transcoder;
wherein the first cloud serves as a first intermediary between the second cloud and the plurality of media presentation devices, and the second cloud serves as a second intermediary between the first cloud and a plurality, of media content sources,
wherein the first cloud preforms registration and signaling operations and aggregates status updates and other feeds or signaling associated with at least some content provider websites, and the second cloud performs transport and delivery operations, wherein the first cloud is configured to operate so that, upon receiving a pause signal from a first of the media presentation devices including bookmark information indicating a location within the media content at which an outputting of the media content has been paused, the first cloud sends the bookmark information for receipt by one or more others of the media presentation devices as well as to the second cloud, and wherein the first cloud further is configured to operate so that, upon receiving a resume signal from a second of the media presentation devices, the first cloud communicates a resume instruction based upon the resume signal to the second cloud and correspondingly the second cloud causes a media content signal to be sent for receipt by the second media presentation device, whereby the second media presentation device is able to output at least a portion of the media content beginning at our substantially at the location.

23. The system of claim 22, wherein the second cloud is configured to process incoming media content signals from the media content sources and configure the incoming media content signals so as to be suitable for the respective media presentation devices.

24. The system of claim 22, wherein each of the first and second servers is a web server, wherein the first cloud receives registration information from each of the media presentation devices, wherein the first cloud receives and manages user preference information from the media presentation devices, and wherein the first cloud processes the pause and resume signals, respectively, prior to providing respectively the bookmark information and resume instruction to the second cloud.

25. The system of claim 22, wherein the media content signal is configured either to be directly communicated from the second cloud for receipt by the second media presentation device, or to be indirectly communicated from the second cloud via the first cloud for receipt by the second media presentation device; and wherein the media content signal is configured either for unicast communication with the second media presentation device or for multicast communication with a plurality of media presentation devices including the second media presentation device.

26. The system of claim 25, wherein the media content signal is configured to be indirectly communicated via the first cloud, and wherein the media content signal is a real-time streamed video content signal with at least some enhanced experience content including one or more of an advertisement, a social networking status update, a friend comment, a rating on a video stream, and another enhanced service integrating video content with social networking information.

27. The method of claim 9, wherein the third signal includes augmented bookmark information including one or more of device characteristic information, user preference information, other preference information, or device registration information, and wherein the second server utilizes the augmented bookmark information to do one or more of the following: to serve appropriate video media content; to determine an appropriate media content source; to reformat data; to play content from a NPT value on a reformatted video asset: to determine whether an augmented bookmark pertaining to first format video data for a given video asset corresponds to a location within second format video data for the given video asset; or to pace a video stream in a correct codec and time format.

* * * * *